(12) United States Patent
Martinez et al.

(10) Patent No.: US 10,346,774 B2
(45) Date of Patent: Jul. 9, 2019

(54) INVENTORY OPTIMIZATION TOOL

(71) Applicant: Accenture Global Services Limited, Dublin (IE)

(72) Inventors: Yair Martinez, Barcelona (ES); Javier Subira Escrig, Sant Cugat del Vallés (ES); Dario Romare, Barcelona (ES); Jaime Lagunas, Barcelona (ES); Robert Gimeno, Barcelona (ES); Ghanshyam Devnani, Karnataka (IN); Rajesh Singh, Bangalore (IN)

(73) Assignee: Accenture Global Services Limited, Dubln (IE)

( * ) Notice: Subject to any disclaimer, the term of this patent is extended or adjusted under 35 U.S.C. 154(b) by 677 days.

(21) Appl. No.: 14/835,463

(22) Filed: Aug. 25, 2015

(65) Prior Publication Data

US 2016/0063419 A1     Mar. 3, 2016

(30) Foreign Application Priority Data

Sep. 1, 2014    (ES) .................................. 201431275

(51) Int. Cl.
*G06Q 10/06*        (2012.01)
*G06Q 10/08*        (2012.01)

(52) U.S. Cl.
CPC ....... *G06Q 10/06315* (2013.01); *G06Q 10/06* (2013.01); *G06Q 10/063* (2013.01);
(Continued)

(58) Field of Classification Search
CPC ..................................................... G06Q 10/06
See application file for complete search history.

(56) References Cited

U.S. PATENT DOCUMENTS

2004/0230473 A1    11/2004   Dogan et al.
2009/0083123 A1*   3/2009   Powell ................. G06Q 10/087
                                                                            705/28
(Continued)

OTHER PUBLICATIONS

Extended European Search Report in Application No. 15183304.3, dated Nov. 12, 2015, 7 pages.
(Continued)

*Primary Examiner* — Kurtis Gills
(74) *Attorney, Agent, or Firm* — Fish & Richardson P.C.

(57) ABSTRACT

This disclosure generally relates to devices, systems, and computer-implemented methods for simulating one or more inventories in a distribution network. Specifically, methods are described that comprise the operations of receiving inventory data for one or more inventories to be simulated, wherein the inventory data includes lead time data and demand data; determining, based on the inventory data, probability distributions for each of lead time and demand for the one or more inventories to be simulated; determining a lead time demand probability distribution of the one or more inventories to be simulated based on the determined probability distributions for the lead time and the demand; determining a predictive state of the one or more inventories to be simulated based on the lead time demand probability distribution; and outputting one or more evaluation parameters associated with the predictive state of the one or more inventories to be simulated.

18 Claims, 7 Drawing Sheets

(52) U.S. Cl.
CPC ..... *G06Q 10/067* (2013.01); *G06Q 10/06375* (2013.01); *G06Q 10/087* (2013.01)

(56) References Cited

U.S. PATENT DOCUMENTS

| | | | | |
|---|---|---|---|---|
| 2010/0114554 A1* | 5/2010 | Misra | ................... | G06Q 10/00 703/22 |
| 2011/0082774 A1* | 4/2011 | Spearman | ............ | G06Q 10/087 705/28 |
| 2011/0208560 A1* | 8/2011 | Najmi | ................... | G06Q 10/06 705/7.31 |
| 2011/0238537 A1* | 9/2011 | Wilson | ................. | G06Q 10/067 705/29 |
| 2014/0200946 A1* | 7/2014 | Humphries | ...... | G06Q 10/06315 705/7.25 |
| 2015/0073925 A1* | 3/2015 | Renfroe | ............ | G06Q 30/0641 705/15 |
| 2015/0081375 A1* | 3/2015 | Sloup | ................... | G06Q 90/00 705/7.25 |

OTHER PUBLICATIONS

Al-Rifai and Rossetti, "An Efficient Heuristic Optimization Algorithm for a Two-Echelon (R,Q) Inventory System," Int'l J Production Economics, 109(1-2): 195-213 (Sep. 2007).

Al-Rifai et al., "An Iterative Heuristic Optimization Model for Multi-Echelon (R,Q) Inventory Systems," IERC, 6 pages (2005).

De Bodt and Graves, "Continuous-Review Policies for a Multi-Echelon Inventory Problem with Stochastic Demand," Management Sci., 31(10):1286-1299 (Oct. 1985).

Humair and Willems, "Optimizing Strategic Safety Stock Placement in General Acyclic Networks," Operations Res., 59(3):781-787 (May-Jun. 2011).

Lee, "Multi-Echelon Inventory Optimization," Evant White Paper Series, 15 pages (2003).

Shapiro and Philpott, "A Tutorial on Stochastic Programming," 35 pages (Mar. 21, 2007).

Snyder, "Multi-Echelon Inventory Optimization: An Overview," EWO Seminar Series, 60 pages (Nov. 13, 2008).

Tian et al., "An iterative approach to item-level tactical production and inventory planning," Int J Production Economics, 12 pages (2010).

Wieland et al., "Optimizing Inventory Levels Within Intel's Channel Supple Demand Operations," Interfaces, 42(6):517-527 (Nov.-Dec. 2012).

European Office Action for Application No. 15183304.3, dated Apr. 4, 2017, 10 pages.

European Summons to Attend Oral Proceedings issued in European Application No. 15183304.3, dated Jul. 5, 2018, 12 pages.

'en.wikipedia.org' [online] "Parallel computing—Wikipedia," Jul. 25, 2014, [retrieved Jun. 14, 2018] Retrieved from the Internet: https://en.wikipedia.org/w/index.php?title=Parallel_computing&oldid=618480373> 19 pages.

'en.wikipedia.org' [online] "Multi-core Processor," Aug. 21, 2014, [retrieved on Jun. 14, 2018] Retrieved from Internet: URL:https://en.wikipedia.org/w/index.php?title=Multi-core_processor&oldid=622173636> 13 pages.

'en.wikipedia.org' [online] "Network topology," Aug. 21, 2014, [Jun. 14, 2018] Retrieved from Internet:<https://en.wikipedia.org/w/index.php?title=network_topology&oldid=622197738> 11 pages.

\* cited by examiner

INVENTORY OPTIMIZATION TOOL

CROSS-REFERENCE TO RELATED APPLICATION

This application claims priority to Spanish Application No. 201431275, filed Sep. 1, 2014, titled "Inventory Optimization Tool," which is incorporated herein by reference.

TECHNICAL FIELD

The present disclosure relates to computer-implemented methods, devices, and systems for providing a model that predicts inventory needs in a distributed logistical network. In particular, the model may assist an inventory developer to design inventories and allocate goods within a distributed logistical network.

BACKGROUND

Global inventory networks become more and more congested due to the increase of global demands for goods. The workload in logistical networks is extremely high during the peak hours. A congested situation could cause many negative effects such as delays, shortages or even cancellations. Thus, evaluation of inventory needs from a global perspective before the scheduled transports is important to stock operators, logistical carriers, shops and the consumer.

Evaluating inventory needs is a difficult task as there are many random factors. All of those factors could have significant influences on the inventory needs. Currently available software provides inventory optimization from a local perspective, that is optimizing single warehouses costs and demands. Thus, a need exists for a model and system that is able to predict inventory needs in a global distributed logistical network.

SUMMARY

The present disclosure relates to computer-implemented methods, devices, and systems for providing a model and system that predicts inventory needs in a distributed logistical network. In particular, the model may assist an inventory developer to design stocks and allocate goods within a distributed logistical network.

One or more of the following aspects of this disclosure can be embodied as methods that include the corresponding operations. One or more of the following aspects of this disclosure can be implemented in a device comprising a processor, a computer-readable medium coupled to the processor having instructions stored thereon which, when executed by the processor, cause the processor to perform operations according to the method of any of the following aspects. One or more of the following aspects of this disclosure can be implemented on a computer-readable medium having instructions stored thereon that, when executed by a processor, cause the processor to perform operations according to the one or more of the following aspects.

In a general aspect 1, a computer-implemented method for simulating one or more inventories in a network comprises the following operations performed by one or more computing devices: receiving inventory data for one or more inventories to be simulated, wherein the inventory data includes lead time data and demand data; determining, based on the inventory data, probability distributions for each of lead time and demand for the one or more inventories to be simulated; determining a lead time demand probability distribution of the one or more inventories to be simulated based on the determined probability distributions for the lead time and the demand; determining a predictive state of the one or more inventories to be simulated based on the lead time demand probability distribution; and outputting one or more evaluation parameters associated with the predictive state of the one or more inventories to be simulated.

Aspect 2 according to aspect 1, wherein the lead time data includes at least one of: purchase orders of particular goods, historical processing time of particular goods by particular suppliers, data about number of goods received at the one or more inventories per unit time.

Aspect 3 according to any one of aspects 1 to 2, wherein the demand data includes sales orders of particular goods.

Aspect 4 according to any one of aspects 1 to 3, wherein the determining of the probability distributions includes minimizing an Akaike Information Criteria.

Aspect 5 according to any one of aspects 1 to 4, wherein the determining of the lead time demand probability distribution includes combining the determined probability distributions for the lead time and the demand by applying a Monte Carlo Simulation to the determined probability distributions for the lead time and the demand.

Aspect 6 according to any one of aspects 1 to 5, the method further comprising: in response to the outputting, automatically initiating at least one of the following actions: moving a loading or unloading of one or more real inventories in the network to another time slot, adding or removing a new real inventory to the network, or adjusting a capacity of a real inventory of the network.

Aspect 7 according to aspect 6, wherein the actions are performed without receiving, at the one or more computing devices, any user input that affects the actions.

Aspect 8 according to any one of aspects 1 to 7, wherein the predictive state or the one or more evaluation parameters includes one or more of the following information associated with the one or more inventories to be simulated: occupied or unoccupied inventory capacity, status of transportation connection to suppliers or shops, connectivity to other inventories in the network, good processing time at the inventories, gas or material consumption, transportation delay with respect to a predetermined schedule, number of conflicts between carriers, or overall and individual inventory occupancies across the network.

Aspect 9 according to any one of aspects 1 to 8, wherein the determining of the predictive state includes: determining a preliminary predictive state of the one or more inventories based on the lead time demand probability distribution; evaluating an optimization function for the preliminary predictive state; comparing the evaluated optimization function with a predetermined objective; determining that the preliminary predictive state does not meet the objective; determining the predictive state based on the preliminary predictive state by changing one or more parameters of the preliminary predictive state to meet the objective.

Aspect 10 according to aspects 9, wherein determining the predictive state based on the preliminary predictive state by changing the preliminary state to meet the objective includes minimizing or maximizing the optimization function with respect to one or more parameters of the inventories.

Aspect 11 according to any one of aspects 9 to 10, wherein the optimization function includes at least one of: a function yielding costs caused by the one or more inventories, a function yielding time required for transportation to or from the one or more inventories, a function yielding overall processing time per unit of goods, a function yielding a distribution of goods across a predetermined spatial area, or a function yielding a number of goods accessible to customers per unit time in a certain region.

Aspect 12 according to any one of aspects 1 to 11, further comprising: parallel pre-processing of the probability distributions for the lead time and the demand, wherein the parallel pre-processing comprises: determining at least one criterion associated with the lead time data or the demand data; based on the determined criterion, selecting a number of lead time data records or demand data records to use in the determining of the probability distributions, and performing the determining of the probability distributions based on the selected number of lead time data records or demand data records; and based on the pre-processing, determining the lead time demand probability distribution of the one or more inventories to be simulated.

Aspect 13 according to any one of aspects 1 to 12, further comprising: pre-processing of the probability distributions for the lead time, the demand and the lead time demand, wherein the parallel pre-processing comprises: determining at least one criterion associated with the lead time data or the demand data; based on the determined criterion, selecting an amount of parallel-processing resources to use in the determining of the probability distributions of lead time, demand or lead time demand, and performing the determining of the probability distributions of lead time, demand or lead time demand using the selected amount of parallel-processing resources.

Figure 1:
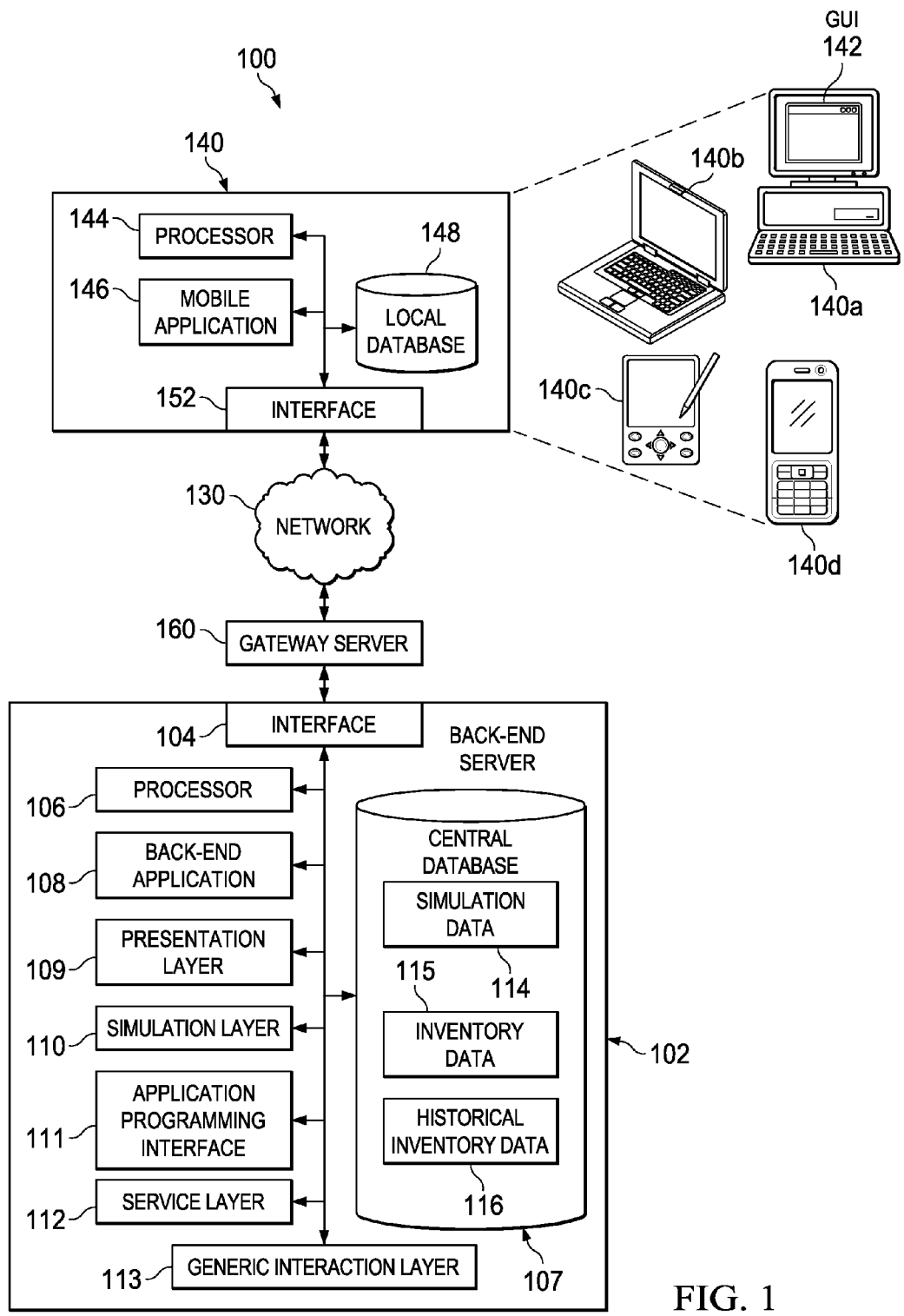
FIG. 1 illustrates an example distributed computing system for implementing an inventory simulation and optimization system.

Reference numbers and designations in the various drawings indicate exemplary aspects, implementations or embodiments of particular features of the present disclosure.

DETAILED DESCRIPTION

There may be difficulties in building an inventory simulation system:
1. Calculating the optimal inventory parameters for each stock keep unit (SKUs) is a computational burden that necessitates the need for efficient policy setting techniques that reduce the computational time, and at the same time, improve the ability of inventory managers to more effectively manage the supply chain.
2. In large (e.g. global) distributed logistical networks, thousands of SKUs are stocked at different inventory holding points (IHPs). These holding points might be at different echelons where the higher echelons supply the lower echelons. Each of these IHPs might follow different stocking policies resulting in decentralized control of the supply network. This case may occur when each of the locations that constitute the supply network are owned by different owners who are not willing to give control of their inventories to external parties. Under this case, each location might not take into consideration interactions with the other locations that might have a significant effect on the efficiency of the whole network as well as on each single location.
3. Evaluating inventory needs is a difficult task as there are many random factors such as lead times, future demand, transportation, shortage, abundance, economies of scale, sales progress, perishability, future capacity, risk of theft or destruction. All of those factors could have significant influences on the inventory needs.

The present disclosure relates to computer-implemented methods, devices, and systems for providing a model and system that predicts inventory needs in a distributed logistical network. Specifically, this document describes an inventory simulation system that is able to predict inventory needs for a large distributed logistical network, taking into account inventory parameters such as lead time, demand and optimization functions.

The subject-matter described in this disclosure can be implemented in particular aspects or embodiments so as to realize one or more of the following example advantages, as well as others recognizable to one of skill in the art.

First, the simulation system is able to flexibly augment the number of stock keeping units (SKU or SKUs) simulated in parallel and can be scaled to a large number (e.g. 10,000 and more) of SKUs.

Second, the simulation is robust with respect to (pseudo-) random events such as changes to: stock capacity, lead times or sales order demands.

Third, the simulation can be adjusted for new SKUs, transportation routes, and product types.

Fourth, the simulation can assist a researcher or developer in the field of logistic control, inventory development, or stock management in improving resource consumption, time consumption, conflict management, or product throughput. The output of the simulation may be used and directly fed back to a stock or an inventory controller for making adjustments to the stock levels, transportation paths or the products associated with the inventories that are simulated. In particular, the model may assist an inventory developer to design inventories and allocate goods or transportation within a distributed (e.g. global) inventory network according to a desired objective. For example, the developer may use a mobile device to access the simulation output and monitor and/or develop the inventory network.

Fifth, the simulation uses robust simulation techniques including probability density functions, Akaike Information Criterion (AIC), and/or Monte Carlo simulation.

FIG. 1 illustrates an example distributed computing system 100 operable to provide an inventory simulation on user devices according to one aspect of the disclosure. Specifically, the illustrated example distributed computing system 100 includes or is communicably coupled with a back-end server 102 (e.g., an enterprise services repository (ESR)

server) and a user device 140 (e.g. inventory developer device) which may communicate across a network 130.

In general, the back-end server 102 is a server that stores one or more back-end applications 108 (e.g., an ESR application, an enterprise resource planning (ERP) application, etc.), where at least a portion of the back-end applications 108 are executed via requests and responses sent to users or clients within and communicably coupled to the illustrated example distributed computing system 100. In some implementations, the back-end server 102 may store a plurality of various back-end applications 108. In other implementations, the back-end server 102 may be a dedicated server meant to store and execute only a single back-end application 108. In some implementations, the back-end server 102 may comprise a web server, where the back-end applications 108 represent one or more web-based applications accessed and executed by the user device 140 via the network 130 or directly at the back-end server 102 to perform programmed tasks or operations of the back-end application 108.

At a high level, the back-end server 102 comprises an electronic computing device operable to receive, transmit, process, store, or manage data and information associated with the example distributed computing system 100. Specifically, the back-end server 102 illustrated in FIG. 1 is responsible for receiving application requests, for example simulation requests, from one or more mobile applications 146 associated with the user device 140 of the example distributed computing system 100 and responding to the received requests by processing said requests in the associated back-end application 108, and sending the appropriate response from the back-end application 108 back to the requesting mobile application 146. In addition to requests from the user device 140, requests associated with the back-end applications 108 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single back-end server 102, environment 100 can be implemented using two or more servers 102, as well as computers other than servers, including a server pool. Indeed, back-end server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated back-end server 102 may be adapted to execute any operating system, including Linux, UNIX, Windows, Mac OS, Java, Android, iOS or any other suitable operating system. According to one implementation, back-end server 102 may also include or be communicably coupled with an e-mail server, a web server, a caching server, a streaming data server, and/or other suitable server.

The back-end server 102 also includes an interface 104, a processor 106, and a central database 107. The interface 104 is used by the back-end server 102 for communicating with other systems in a distributed environment—including within the environment 100—connected to the network 130; for example, the user device 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the back-end server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the back-end server 102. Specifically, the processor 106 executes the functionality required to receive and respond to requests from the user device 140 and/or allowing providing inventory simulations on user device 140.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Objective C, Java, Visual Basic, assembler, Perl, any suitable version of 4GL, industry standard language, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The back-end server 102 also includes the central database 107, or multiple central databases 107. The central database 107 may include any type of memory or database module and may take the form of volatile and/or non-volatile memory including, without limitation, magnetic media, optical media, random access memory (RAM), read-only memory (ROM), removable media, or any other suitable local or remote memory component. The central database 107 may store various objects or data, including caches, classes, frameworks, applications, backup data, jobs, web pages, web page templates, entities in industry standard language, database tables, repositories storing business and/or dynamic information, and any other appropriate information including any parameters, variables, algorithms, instructions, rules, constraints, or references thereto associated with the purposes of the back-end server 102. Additionally, the central database 107 may include any other appropriate data, such as VPN applications, firmware logs and policies, firewall policies, a security or access log, print or other reporting files, as well as others. While central database 107 is illustrated as in integral component of the back-end server 102, in alternative aspect or implementation central database 107 can be external to the back-end server 102 and/or the example distributed computing system 100.

The back-end server 102 further includes an application programming interface (API) 111. The API 111 may include specifications for routines, data structures, and object classes. The API 111 may be either computer language independent or dependent and refer to a complete interface, a single function, or even a set of APIs. In some implementations, the API 111 can be used to interface between the back-end application 108 and/or one or more components of the back-end server or other components of the example distributed computing system 100, both hardware and software. For example, in one implementation, the back-end application 108 can utilize API 111 to communicate with the user device 140. Although the API 111 is shown as a stand-alone component within the back-end server 102, there may be multiple other APIs in the example distributed computing system 100 that are integrated into or accessible by individual components, both hardware and software. The back-end server 102 (e.g., an ESR server) may be based on a Java platform and/or the back-end application may be based on a Java runtime environment. In an aspect, the term "platform" or "technology" is understood to be at least one of operating system, hardware infrastructure and software development platform. In an implementation of the present disclosure described herein, the term "platform" or "technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "technology" comprises ByDesign platform, Success Factors Platform, ERP Suite technology or in-memory database platforms.

The service layer 112 provides software services to the example distributed computing system 100. The functionality of the back-end server may be accessible for all service consumers via this service layer. Software services, such as inventory simulations, provide reusable, defined business functionalities through a defined interface. The defined interface may be software written in extensible markup language (XML) or other suitable language. While illustrated as an integrated component of the back-end server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module or enterprise application (not illustrated) or of another hardware module (not illustrated) without departing from the scope of this disclosure.

The central database 107, i.e., a back-end data system, holds data or metadata for the back-end server 102. In some implementations, the central database 107 includes simulation data 114, inventory data 115, and historical inventory data 116. Although illustrated as single instances, there may be more than one instance of the data 114, 115, and/or 116.

In an aspect, the inventory data 115 may include at least one of: lead time data and demand data. In an aspect, the historical inventory data 116 may include at least one of the following information for the historical inventory events: lead time data such as historical processing time of particular goods by particular suppliers (e.g. based on purchase order data), and demand data such as sales and future orders of particular goods (e.g. based on sales order data). In an aspect, the simulation data 114 may include simulation results such as one or more evaluation parameters that may include at least one or more of the following parameters associated with the one or more inventories to be simulated: occupied or unoccupied inventory capacity, status of transportation connection to suppliers or shops, connectivity to other inventories in the network, good processing time at the distribution center(s) handling the inventories, gas or material consumption, transportation delay with respect to a predetermined schedule, number of conflicts between carriers, or overall and individual inventory occupancies across the network.

Access to the back-end server 102 may be provided through the user device 140, for example, via a web browser or other suitable GUI 142 application interfacing with the user interface (UI) presentation layer 109 that further interfaces with the application programming interface 111 provided by a simulation layer 110. The simulation layer 110 provides a consistent interface for a GUI application to access data 114, 115, 116 associated with the back-end application 108. Associated with the simulation layer 110 is a generic interaction layer 113 which provides a consistent interface for the simulation layer 110 to access back-end application 108 and data 114, 115, 116 through APIs 111 and for the back-end application 108 to return data to the user device 140. At a high-level, generic interaction layer 113 may act as a bridge between the user device 140 and the back-end application 108. Because of this architecture, the user device 140 may not affected by changes to the underlying back-end application 108 as long as the simulation layer 110, generic interaction layer 113 or APIs 111 interface(s) does not change. This architecture also may ensure that changes to a particular layer, API, etc. can also be isolated from affecting other layers, APIs, etc. While described as a generic interaction layer 113, the interaction layer 113 may be proprietary or otherwise non-generic in other implementations.

User devices 140 may access the back-end server 102 through the gateway server 160. The gateway server 160 provides one or more defined APIs and acts as an interface or gateway between a user device 140 and the back-end server 102. In some implementations, the gateway server 160 can communicate with user device 140 using Open Data (OData) protocol through hypertext transfer protocol (HTTP) or hypertext transfer protocol secure (HTTPS) requests. In some implementations, the gateway server 160 can use a remote function call (RFC) interface to communication with advanced business application programming (ABAP) language and/or non-ABAP programs. In some implementations, the gateway server 160 can be stand-alone. In some implementations, the gateway server 160 can be incorporated into any component of the example distributed computing system 100. In some implementations the gateway server 160 may be a hardware server, a software server, and/or a virtual server. In some implementations, the gateway server 160 can be part of a web server, a streaming server, an RSS server, or other suitable server.

The illustrated user device 140 further includes a processor 144, a local database 148, an interface 152, and a mobile application 146. In a general aspect, the user device 140*a-d* may be a tablet computer, a smartphone, a cell phone, a personal digital assistant (PDA), an e-book reader, a laptop or desktop computer or similar mobile computing devices. The mobile application 146 allows the user device 140 to request and view content on the user device 140. In some implementations, the mobile application 146 can be and/or include a web browser. In some implementations, the mobile application 146 can use parameters, metadata, and other information received at launch to access a particular set of data from the server 102. Once a particular mobile application 146 is launched, a user can interactively process a task, event, or other information which may be associated with the back-end server 102. Further, although illustrated as a single mobile application 146, the mobile application 146 may be implemented as multiple mobile applications in the user device 140.

Customers (e.g., users of devices 140a-d) may run on-premise systems in hybrid landscapes together with on-demand systems, consuming data from both. Therefore, a set of tools that span across different platforms may be used to provide an easy and efficient development experience around OData. To do so, the simulation layer 110 may be built as a building block for the development of user-centric applications.

Figure 2:
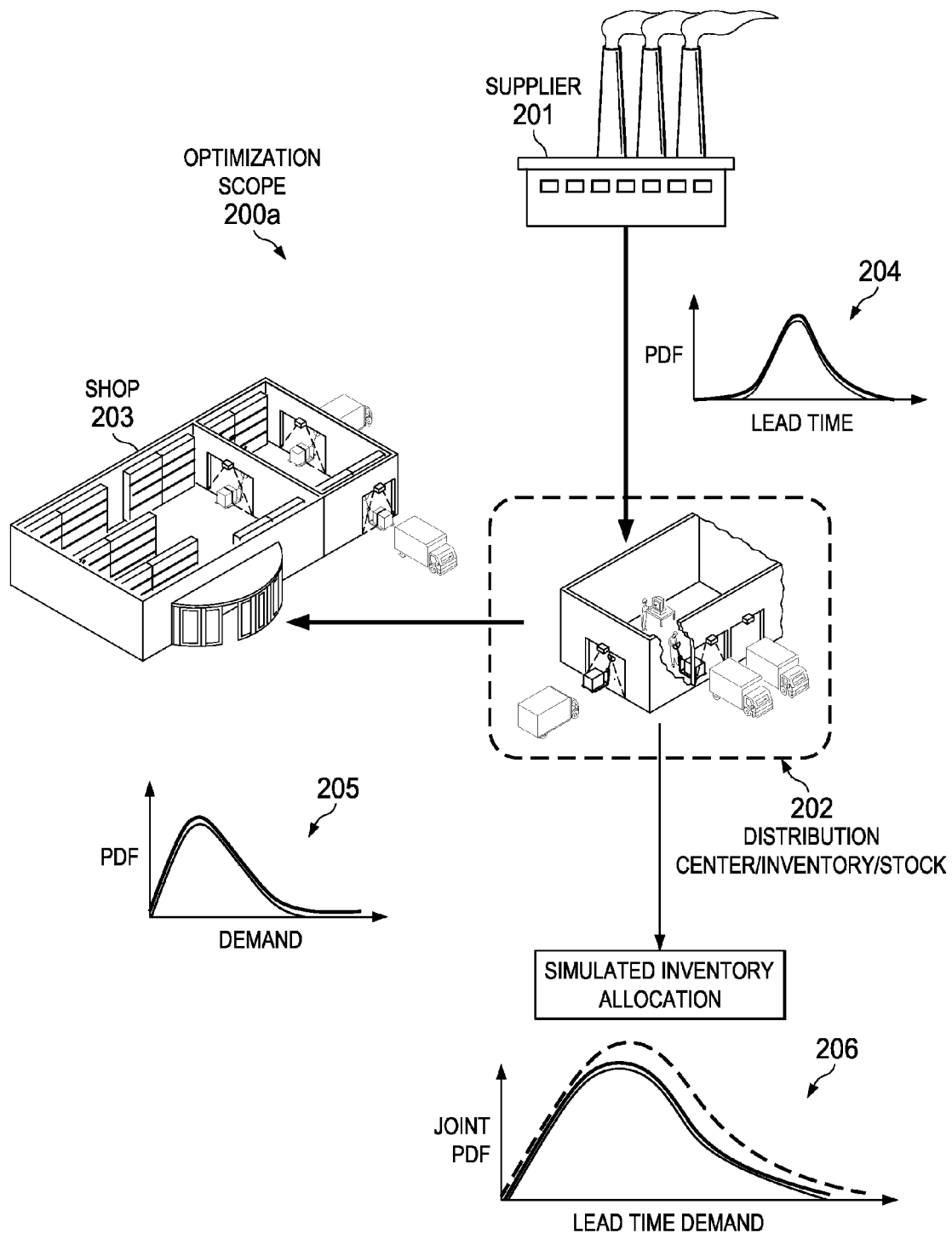
FIG. 2 illustrates an exemplary inventory network including a supplier, central warehouse inventory, and retail shop.

FIG. 2 illustrates an exemplary inventory network 200 including supplier 201, inventory 202 and shop 203. The shop 203 may be a retail or wholesale shop. Goods or products to be sold to a customer at the shop 203 are supplied by the supplier 201 to the inventory, stock or distribution center 202. The "lead time" 204 may be understood as the time duration needed to deliver the goods from the supplier to the inventory 202, for example including any processing time needed by the inventory 202 to make the received goods available to a transportation carrier (e.g such as a truck) from the inventory 202 to the shop 203. In addition to the lead time, the demand 205 is affecting the inventory. The "demand" may be understood as the number of goods demanded by the shop 203 from the inventory in a certain amount of time (e.g. based on current and/or historical sales data associated with the goods). The lead time and/or the demand may be used to simulate an inventory allocation 206, e.g. based on a simulated lead time demand probability distribution function which may be derived from a combination of a probability distribution function of the lead time 204 and a probability distribution function of the demand 205. The simulated inventory allocation may be a predicted inventory allocation for the future that is based on current and/or historical inventory data (e.g., lead time or demand data). This predicted inventory allocation may be a predictive state of the inventory 202, which may be used to optimize the inventory 202. The term "PDF" used herein can be understood as probability distribution function or probability density function. The scope of optimization (e.g., optimization function) may include various parameters of the inventory such as costs caused by the inventory, time required for transportation to or from the distribution center(s) handling the inventory, overall processing time per unit of goods, a distribution of goods across a predetermined spatial area, or a number of goods accessible to customers per unit time in a certain region. The output of the simulated and/or optimized inventory allocation may be used to perform adjustments to parameters of the inventory 202, the supplier 201 and/or the shop 203. The adjustments may include one or more of moving a loading or unloading of one or more real inventories in the distribution network to another time slot, adding or removing a new real inventory to the distribution network, and adjusting a capacity of a real inventory of the distribution network.

Figure 3A:
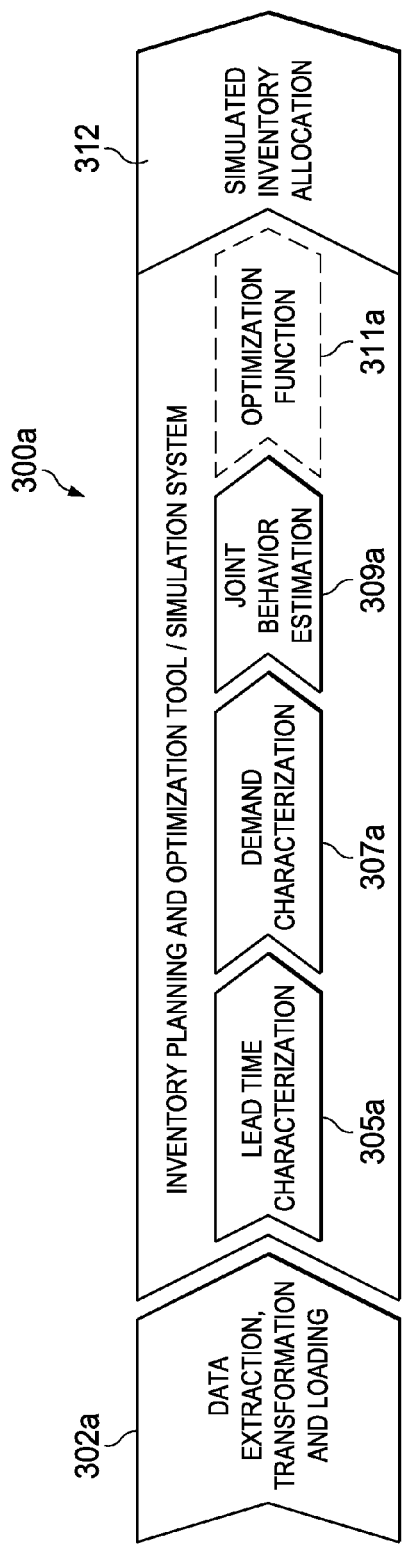
FIG. 3A illustrates an exemplary method for planning and optimizing inventory in a distribution network.
Figure 3C:
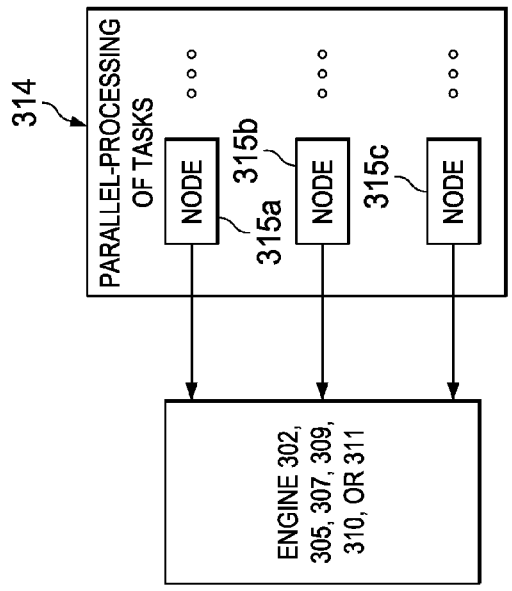
FIG. 3C illustrates an exemplary parallel-processing system for performing tasks for the planning and optimizing system for inventory in a distribution network.
Figure 3B:
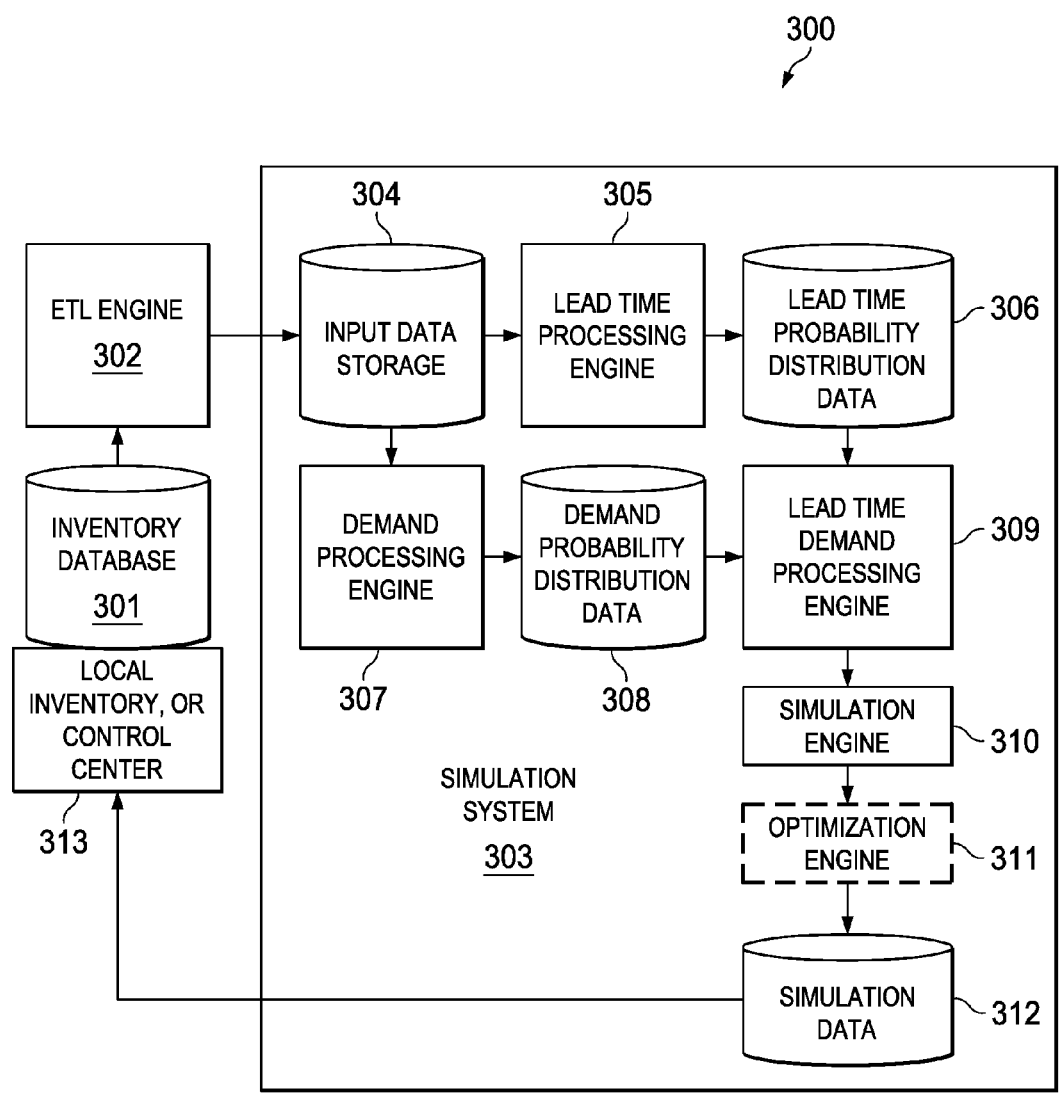
FIG. 3B illustrates an exemplary system for implementing an inventory planning and optimizing system for inventory in a distribution network.

FIGS. 3A and 3B illustrate an exemplary method 300a and system 300, respectively, for simulating one or more inventories, in particular for planning and optimizing inventory in a distribution network. The method may include, at a step 302a performed by an extract-transform-load (ETL) engine 302, a data extraction (e.g. extraction of lead time data from a large database of purchase order data and supplier data, demand data from a large database of sales order data, data from the shop, and/or data from a distribution center managing the inventory) from a local database (e.g. inventory) 301, transformation of the extracted data to a format accepted by the simulation system 303, and loading the transformed data to an input data storage 304 of the simulation system 303. The method may include, at a subsequent step 305a performed by lead time processing engine 305, a characterization or determination of the lead time 204. The method may include, at a subsequent step 307a performed by demand processing engine 307, a characterization or determination of the demand 205. The method may include, at a subsequent step 309a performed by processing engine 309 (e.g. a processing engine that executes a stochastic analysis process, a Monte Carlo simulation, or a correlation between the lead time PDF and demand PDF), an estimation or a determination of the lead time demand 206 by using a joint operation of the lead time 204 and the demand 205. A simulation engine 310 of the simulation system 303 may determine a predictive state of the one or more inventories to be simulated based on the lead time demand probability distribution. The method 300a may include, at an optional subsequent step 311a performed by optimization engine 311, an evaluation of an optimization function to optimize the inventory network towards an objective. The simulation system 303 and the ETL engine 302 may be implemented on the same processing device. The simulation system 303 and/or the ETL engine may be backend server 102 of FIG. 1. The simulation system 303 may output the simulated inventory allocation 312a as part of the simulation data 312, e.g., to a device 140 of an inventory developer and/or to an inventory 313. The data associated with the probability distributions of the lead time, the demand and the lead time demand may be stored in respective data storages 306, 308, 312 of the simulation system 303. In other words, the method 300a may be performed by one or more computing devices and comprise the following operations: receiving inventory data for one or more inventories to be simulated, wherein the inventory data includes lead time data and demand data; determining, based on the inventory data, probability distributions for each of lead time and demand for the one or more inventories to be simulated; determining a lead time demand probability distribution of the one or more inventories to be simulated based on the determined probability distributions for the lead time and the demand; determining a predictive state of the one or more inventories to be simulated based on the lead time demand probability distribution; and outputting one or more evaluation parameters associated with the predictive state of the one or more inventories to be simulated.

In an aspect, a portion of the simulation data 312 is (e.g., automatically) fed to a device 140 of an inventory developer and/or to a local inventory, or central control center 313 to perform the adjustments to the inventory network to meet an objective. For example, the method 300a includes, in response to the outputting, automatically initiating at least one of the following actions: moving a loading or unloading of one or more real inventories 202, 313 in the network to another time slot, adding or removing a new real inventory 202, 313 to the network, or adjusting a capacity of a real inventory 202, 313 of the network. In an aspect, the actions are performed without receiving, at the simulation system 303, any user input that affects the actions.

FIG. 3C illustrates an exemplary parallel-processing system 314 for performing tasks for simulating one or more inventories, in particular for planning and optimizing an inventory network. One or more of the engines 302, 305, 307, 309, 310, or 311 may execute their respective tasks on a parallel-processing resource such as a server platform. The parallel-processing resource may include multiple processing nodes that execute a portion of the tasks in parallel so that the tasks are divided in sub-tasks, wherein each node performs an assigned sub-task, or so that an entire task is executed by each of the nodes in parallel.

In an aspect, the method 300a includes: performing a parallel pre-processing of the probability distributions for the lead time and the demand, wherein the parallel pre-processing comprises: determining at least one criterion associated with the lead time data or the demand data; based on the determined criterion, selecting a number of lead time data records or demand data records to use in the determining of the probability distributions, and performing the determining of the probability distributions based on the selected number of lead time data records or demand data records; and based on the pre-processing, determining the lead time demand probability distribution of the one or more inventories to be simulated. In an aspect, the method 300a includes: performing pre-processing of the probability distributions for the lead time, the demand and the lead time demand, wherein the parallel pre-processing comprises: determining at least one criterion associated with the lead time data or the demand data; based on the determined criterion, selecting an amount of parallel-processing resources 314 (e.g. selecting the number of nodes 315a-c) to use in the determining of the probability distributions of lead time, demand or lead time demand, and performing the determining of the probability distributions of lead time, demand or lead time demand using the selected amount of parallel-processing resources 314. In an aspect, the criterion may be inventory data quality (e.g., the fraction of incomplete or damaged data records), number of received inventory data records, deviation of the associated probability distribution compared to a predetermined distribution, origin of the received inventory data or the like. One may use modern multiple-core CPUs to divide a particular computing task into parallel subtasks running concurrently, thus speeding up execution time. Open-source libraries may be used to implement parallel processing on computational heavy loops. Such loops may occur in inventory simulation, especially when creating and manipulating the lead time demand distribution matrices and vectors by Monte Carlo simulation.

The criterion may include, for example, any one or more of: a) a determination and comparison of multi echelon versus single echelon inventory networks; b) the number of locations (i.e. nodes) in the inventory network; c) the number of SKUs in manufacturing and in distribution, based for example on information extracted from bill of materials records; and d) the number of connections in the inventory network. The system 300 is operable to selectively determine based on one or more of the criterion, which data sets and/or tasks should be handled as a sub-task and processed by the parallel-processing system 314. The system 300 is also operable to determine which of the one or more engines 302, 305, 307, 309, 310, or 311 may execute their respective tasks or sub-tasks on the parallel-processing system 314 based on the one or more criterion. The parallel-processing system 314 may be a special purpose processor having multiple processing cores that are designed to process, for example, large data sets associate with a large number of SKUs and optimize computations associated with lead time and demand in the inventory network. In this implementation, the parallel-processing system 314 may include multiple special purpose processing engines where each processing engine includes multiple processing cores (e.g. four, eight, or sixteen processing cores in a single processing engine). As an exemplary implementation the parallel processing system 314 may include eight processing engines where each processing engine includes eight processing cores. This architecture provides a parallel processing system with sixty four (64) processing cores. The data associated with one SKU is then processed by one processing core which allows the optimization computations to be executed in parallel for sixty four (64) unique SKUs within the inventory network. This exemplary architecture can be scaled as necessary and provides a significant advantage for handling the computationally intensive processing requirements for optimizing an inventory network with a large number of SKUs, and/or an inventory network with multiple echelons, by significantly reducing the processing time.

Figure 4:
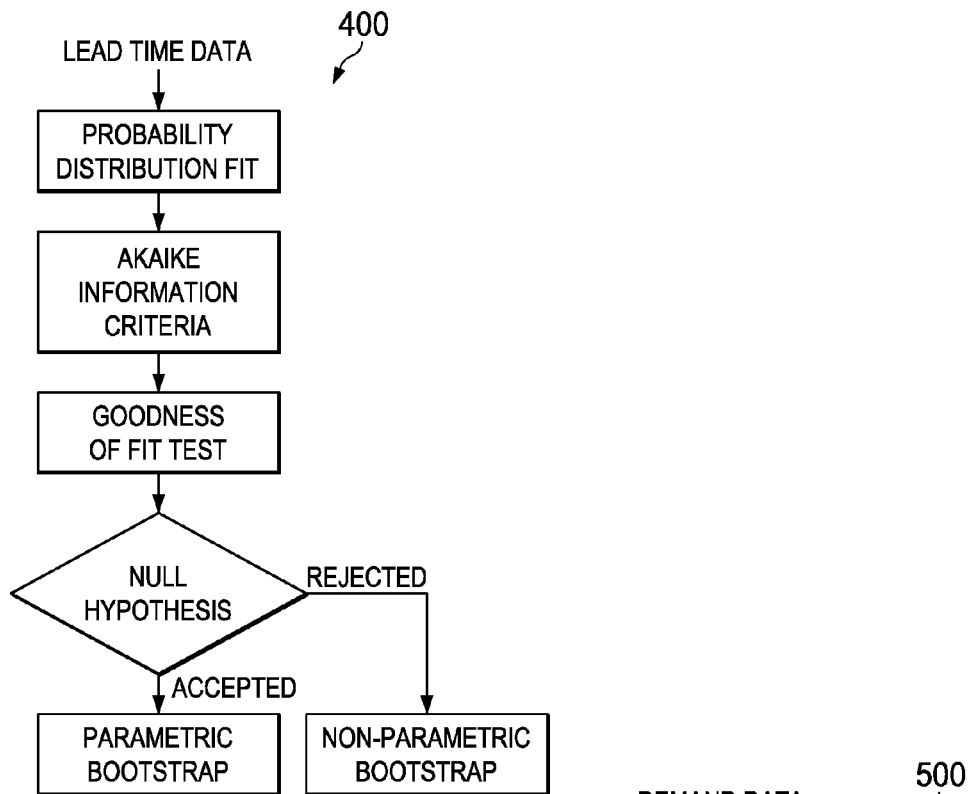
FIG. 4 illustrates an exemplary method for determining a probability distribution function for the lead time.

FIG. 4 illustrates an exemplary method 305a, 400 for determining a probability distribution function for the lead time. The observed distribution of the lead times of the purchase orders of a certain material or items is approximated by a theoretical distribution. If the goodness of the distribution fit is not good enough, a simulation of the observed sample is used. When the goodness of the distribution fit is good enough, the method 400 can skip simulation of the observed sample to reduce computational time. In this method 400 the observed distribution of the lead times of the purchase orders of a certain item is approximated by a theoretical distribution. Depending on the number of data points available two different procedures are used:

1. When not enough data points are available, the method uses a Gamma approximation (continuous and two-parameter) to allow the standard deviation to be different from the mean. Lower and upper bounds can be set to restrict the range of the lead time distribution, giving rise to a Truncated Gamma with four parameters. It should be understood that the implementation of this method is quite flexible both in the choice of the distribution and of its parameters.
2. When there are enough data points the distribution models that may be used include: Normal, Exponential and Gamma when data are real-valued; and Normal, Exponential, Gamma, Poisson, Negative Binomial and Geometric when the lead time data are discrete. It should be understood that the implementation of this method allows additional distribution models to be used. The goodness of the distribution fit is calculated through the following steps:

Closed formula used for model estimation (method of matching moments)

Choose "best" model which minimizes Akaike Information Criterion

Apply goodness of fit tests to accept or reject "best" model

Goodness of fit test include Chi-squared, Kolmogorov-Smimov and Anderson-Darling tests.

In an aspect, statistical software is used to perform fitness tests of the daily demand behaviour against the predefined probability distributions and to perform fitness tests of the lead time distribution against the predefined probability distributions.

Figure 5:
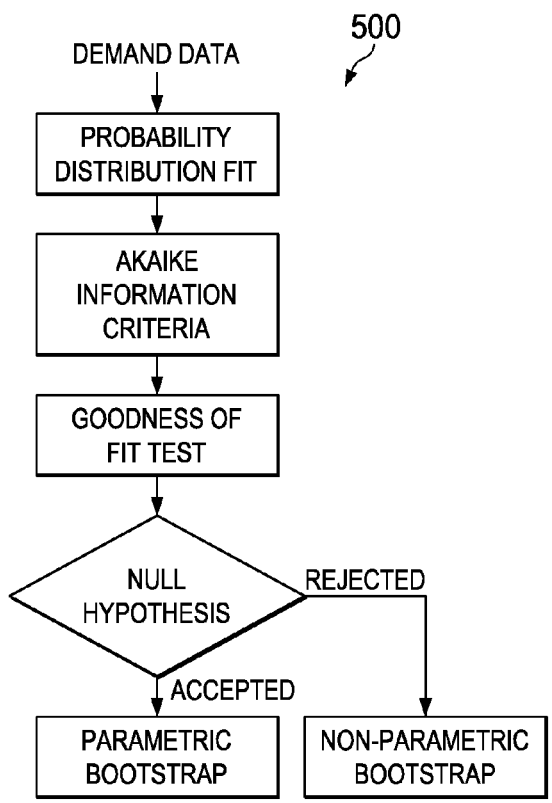
FIG. 5 illustrates an exemplary method for determining a probability distribution function for the demand.
Figure 6:
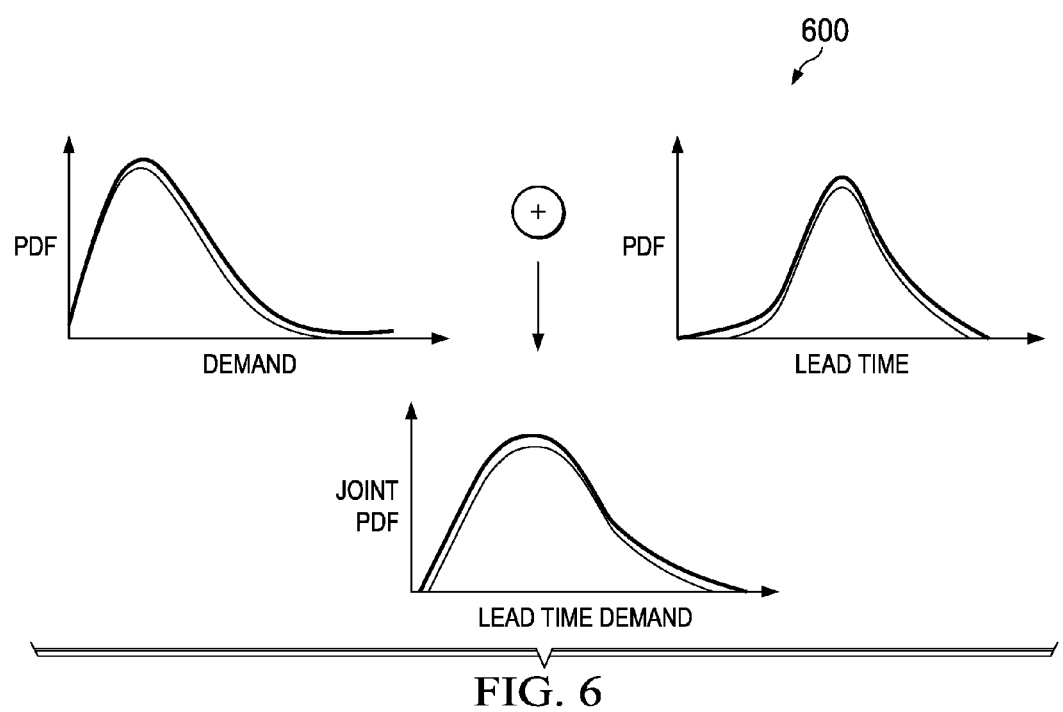
FIG. 6 illustrates an exemplary method for determining a joint probability distribution function for the lead time demand.

FIG. 5 illustrates an exemplary method 307a, 500 for determining a probability distribution function for the demand. The observed distribution of the demand of the sales orders of a certain material is approximated by a theoretical distribution. If the goodness of the distribution fit is not good enough a simulation of the observed sample is used. When the goodness of the distribution fit is good enough, the method 500 can skip simulation of the observed sample to reduce computational time. In this method 500, the observed distribution of the demand of the sales orders of a certain material is approximated by a theoretical distribution. The demand from downstream locations may be rolled-up to upstream location lagged by the transportation time. Depending on the number of data points available two different procedures are used:
1. When not enough data points are available, the safety stocks and reorder points cannot be calculated
2. When there are enough data points the distribution models used are: Poisson, Negative Binomial, Geometric, Exponential, Normal y Gamma. The goodness of the distribution fil is calculated through the following steps:
Closed formula used for model estimation (method of matching moments)
Choose "best" model which minimizes Akaike Information Criterion
Apply goodness of fit tests to accept or reject "best" model
Goodness of fit test include Chi-squared, Kolmogorov-Smirnov and Anderson-Darling tests FIG. 6 illustrates an exemplary method 309a, 600 for determining a joint probability distribution function for the lead time demand, wherein the determining of the lead time demand probability distribution includes combining the determined probability distributions for the lead time and the demand by applying a Monte Carlo simulation to the determined probability distributions for the lead time and the demand. In an aspect, the demand during the lead time represents the period of time during which we have to cover against the risk of receiving a peak of demand. For that reason, to calculate the optimal reorder point we need find out the combined distribution of the demand during the Lead Time. To combine the daily demand and the lead time distribution a Monte Carlo simulation is performed to generate the combined distribution probability function.

In an aspect, random samples are generated from "best" demand and lead time models (parametric bootstrap). In an aspect, if "best" model was rejected, random samples are drawn with replacement from the original data (nonparametric bootstrap). Lags for demand at upstream locations are obtained by taking medians of original demand data at downstream. More specifically, with regard to medians, any estimate of the population mean can be taken, such as sample averages, trimmed means, weighted means, winsorized means, and sample medians. In an aspect, we obtain a 1×N vector of LTj values, j=1, . . . N, and a M×N matrix of demand Dij values, where M=max(LTj) and N=number of bootstrap replicates (typically, N=5000). In an aspect, the simulated Lead Time demand joint distribution is made up of N values, each j value being the sum of the Dij values over i=LTj. In an aspect, lead time demand at downstream locations depends on lead time and probability of stocking out at upstream locations: Eff_LTdownstream=LTdownstream+[(1−SL)*LT]upstream. In an aspect, generation of lead time demand matrices during Monte Carlo simulation, as the sum of Dij values is not over i=LTj anymore, but is now over LTj+another random term which is a function of the Service Level upstream. In an aspect, for each value of the service level upstream, we could find the corresponding Eff_LT downstream; however, if we want to minimize the cost function we would normally treat the service level upstream as an unknown output rather than a known input.

$$\text{Effective } LT_1 = LT_1 + \text{Prob. Stock Out}(CW) \cdot LTS$$

$$\text{Prob. SOut}(CW) = \text{``1} - SL_{CW}\text{''} = E[DCW \cdot LT_S > RCW]$$

-continued $$G(R, D) = \sum_{i=1}^{N} G_i(R_i, Di)$$

$$G_i(R_i, Di) = h_i \cdot E[R_i > Di_{efLTi}]^+ + b_i \cdot E[Di_{efLTi} > Ri]^+$$

Global cost function G(R,D) is the sum of local cost functions $G_i(R_i,Di)$ at all N locations
$Di_{ef LTi}$ is the Monte Carlo simulated effective lead time demand matrix at location i
Local cost $G_i$ is a function of holding cost $h_i$, and backordering cost $b_i$ at location i
The optimization problem consists in finding the optimal set of reorder points $R_i$ which minimizes the global cost function G(R,D), possibly subject to service level (SL) restrictions ($R_i$>$min_i$) at the network (service level (SL) restrictions can be enforced at all echelon levels)
This is equivalent to finding optimal safety stock levels at all locations (subject to SL restrictions)
The optimization process is based on a method (Quasi-Newton methods perform local optimization) which allows box constraints, that is each variable can be given a lower and/or upper bound. The initial $R_i$ values must satisfy the constraints. The optimization process is able to perform global optimization with nonlinear inequalities and box constraints. The global optimum can then be used as a starting point for a local optimization to refine the solution to a greater accuracy
In order to speed up convergence of the algorithm, initial $R_i$ values are given as midpoints of box constraints because global minimum is a function of all $R_i$.

Figure 7:
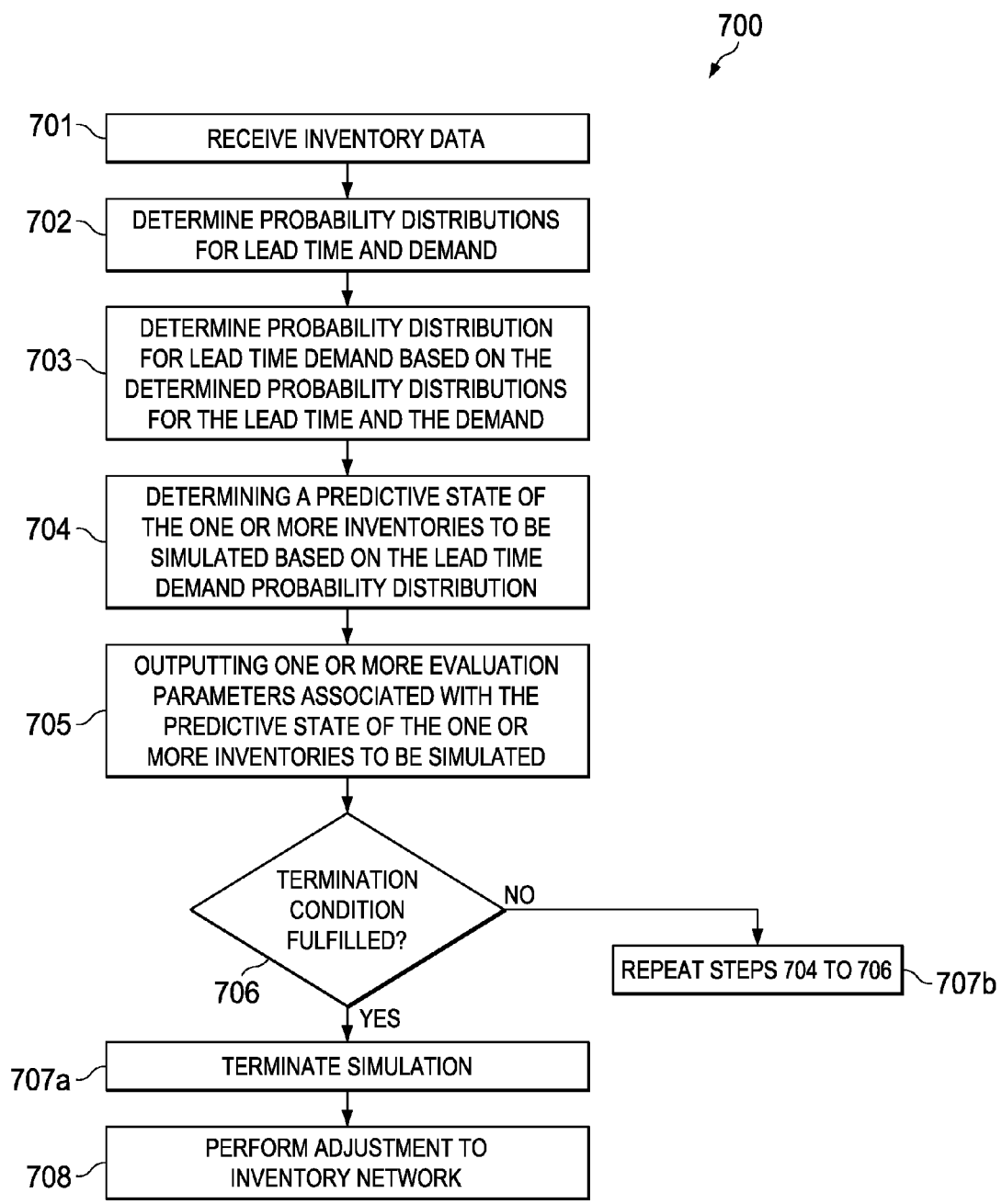
FIG. 7 illustrates an exemplary method for simulating one or more inventories in a distribution network.

FIG. 7 illustrates an exemplary method 700 for simulating one or more inventories in a network. At 701, inventory data is received, wherein the demand data includes sales orders of particular goods, and wherein the lead time data includes at least one of: purchase orders of particular goods, historical processing time of particular goods by particular suppliers, data about number of goods received at the one or more inventories per unit time.

At 702, probability distributions for lead time and demand are determined. In an aspect, the probability distributions are probability density functions and wherein the determining of the probability distributions includes minimizing an Akaike Information Criteria. In an aspect, step 702 includes performing parallel pre-processing of the probability distributions for the lead time and the demand, wherein the parallel pre-processing comprises: determining at least one criterion associated with the lead time data or the demand data; based on the determined criterion, selecting a number of lead time data records or demand data records to use in the determining of the probability distributions, and performing the determining of the probability distributions based on the selected number of lead time data records or demand data records; and based on the pre-processing, determining the lead time demand probability distribution of the one or more inventories to be simulated.

At 703, a probability distribution for lead time demand is determined based on the determined probability distributions for the lead time and the demand. In an aspect, the determining of the lead time demand probability distribution includes combining the determined probability distributions for the lead time and the demand by applying a Monte Carlo Simulation to the determined probability distributions for the lead time and the demand.

At 704, a predictive state of the one or more inventories to be simulated is determined based on the lead time demand probability distribution. In an aspect, the predictive state includes one or more of the following information associated with the one or more inventories to be simulated: occupied or unoccupied inventory capacity, status of transportation connection to suppliers or shops, connectivity to other inventories in the network, good processing time at the inventories, gas or material consumption, transportation delay with respect to a predetermined schedule, number of conflicts between carriers, or overall and individual inventory occupancies across the network.

In an aspect, the determining of the predictive state includes: determining a preliminary predictive state of the one or more inventories based on the lead time demand probability distribution; evaluating an optimization function for the preliminary predictive state; comparing the evaluated optimization function with a predetermined objective; determining that the preliminary predictive state does not meet the objective; determining the predictive state based on the preliminary predictive state by changing one or more parameters of the preliminary predictive state to meet the objective. In an aspect, the determining of the predictive state based on the preliminary predictive state is performed by changing the preliminary state to meet the objective includes minimizing or maximizing the optimization function with respect to one or more parameters of the inventories. In an aspect, the optimization function includes at least one of: a function yielding costs caused by the one or more inventories, a function yielding time required for transportation to or from the one or more inventories, a function yielding overall processing time per unit of goods, a function yielding a distribution of goods across a predetermined spatial area, or a function yielding a number of goods accessible to customers per unit time in a certain region.

At 705, one or more evaluation parameters associated with the predictive state of the one or more inventories to be simulated are outputted. In an aspect, the one or more evaluation parameters includes one or more of the following information associated with the one or more inventories to be simulated: occupied or unoccupied inventory capacity, status of transportation connection to suppliers or shops, connectivity to other inventories in the network, good processing time at the inventories, gas or material consumption, transportation delay with respect to a predetermined schedule, number of conflicts between carriers, or overall and individual inventory occupancies across the network.

At 706, it is determined if a termination condition is fulfilled by the results of the simulation (e.g. the evaluation parameters).

At 707a, the simulation is terminated if the termination condition is fulfilled. At step 708, an adjustment to the inventory network is performed. In an aspect, step 708 includes: in response to the outputting, automatically initiating at least one of the following actions: moving a loading or unloading of one or more real inventories in the network to another time slot, adding or removing a new real inventory to the network, or adjusting a capacity of a real inventory of the network, In an aspect, the actions are performed without receiving, at the one or more computing devices, any user input that affects the actions.

At 707b, the simulation steps 704 to 706 are repeated if the termination condition is not fulfilled.

The preceding figures and accompanying description illustrate example processes and computer implementable techniques. But example distributed computing system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example distributed computing system 100 may use processes with additional operations, fewer operations, and/or different operations, so long as the methods remain appropriate. Process operations may also be executed and described software/services may also execute on various components of example distributed computing system 100 so long as the methods remain appropriate. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A computer-implemented method for simulating one or more inventories in a distribution network, the method comprising the following operations performed by one or more computing devices:
   generating, in parallel by one or more first cores of a multi-core server that implements an inventory optimization tool, one or more probability distributions, comprising:
      receiving, by an inventory optimization tool that generates a probability distribution and that includes a simulation component that, when the probability distribution does not satisfy a corresponding threshold fit, performs one or more additional computation processes for generating a simulation of an observed sample for data of the corresponding probability distribution to determine a predictive state of the one or more inventories, inventory data for one or more inventories, wherein the inventory data includes lead time data and demand data,
      determining, based on the inventory data, a lead time probability distribution for the one or more inventories, and
      determining, based on the inventory data, a demand probability distribution for the one or more inventories;
   generating, in parallel by one or more second cores of the multi-core server that implements the inventory optimization tool, the predictive state, comprising:
      determining, by the inventory optimization tool, whether the lead time probability distribution satisfies a first threshold distribution fit, the demand probability distribution satisfies a second threshold distribution fit, or both,
      in response to determining that the lead time probability distribution satisfies the first threshold distribution fit, the demand probability distribution satisfies the second threshold distribution fit, or both, determining, by the inventory optimization tool, to use the previously-generated lead time probability distribution, demand probability distribution, or both, for generating the predictive state rather than to have the simulation component perform the one or more additional computation processes for generating a simulation of an observed sample to determine the predictive state of the one or more inventories using the inventory data, in response to determining to use the previously-generated lead time probability distribution, demand probability distribution, or both, for generating the predictive state rather than to have the simulation component perform the one or more additional computation processes for generating a simulation of an observed sample using the inventory data, determining a lead time demand probability distribution of the one or more inventories that indicates a demand for the one or more inventories during the lead time using a combination of the determined lead time probability distribution and the determined demand probability distribution, and determining the predictive state of the one or more inventories using the lead time demand probability distribution; and in response to generating the predictive state of the one or more inventories based on the lead time demand probability distribution, moving a loading or unloading of one or more real inventories in the network to another time slot, adding or removing a new real inventory to the network, or adjusting a capacity of a real inventory of the network without receiving, at the one or more computing devices, any user input that affects the actions.

2. The method of claim 1, wherein the lead time data includes at least one of: purchase orders of particular goods, historical processing time of particular goods by particular suppliers, or data about number of goods received at the one or more inventories per unit time.

3. The method of claim 1, wherein the demand data includes sales orders of particular goods.

4. The method of claim 1, wherein the determining of the probability distributions includes minimizing an Akaike Information Criteria.

5. The method of claim 1, wherein the determining of the lead time demand probability distribution includes combining the determined probability distributions for the lead time and the demand by applying a Monte Carlo Simulation to the determined probability distributions for the lead time and the demand.

6. The method of claim 1, wherein determining to use the previously-generated lead time probability distribution, demand probability distribution, or both, for generating the predictive state rather than to have the simulation component perform the one or more additional computation processes for generating a simulation of an observed sample to determine the predictive state using the inventory data is further based on one or more of the following information associated with the one or more inventories: occupied or unoccupied inventory capacity, status of transportation connection to suppliers or shops, connectivity to other inventories in the network, good processing time at the inventories, gas or material consumption, transportation delay with respect to a predetermined schedule, number of conflicts between carriers, or overall and individual inventory occupancies across the network.

7. The method of claim 1, wherein the determining of the predictive state includes:

determining a preliminary predictive state of the one or more inventories based on the lead time demand probability distribution;

evaluating an optimization function for the preliminary predictive state;

comparing the evaluated optimization function with a predetermined objective;

determining that the preliminary predictive state does not meet the objective; and determining the predictive state based on the preliminary predictive state by changing one or more parameters of the preliminary predictive state to meet the objective.

8. The method of claim 7, wherein determining the predictive state based on the preliminary predictive state by changing the preliminary state to meet the objective includes minimizing or maximizing the optimization function with respect to one or more parameters of the inventories.

9. The method of claim 7, wherein the optimization function includes at least one of: a function yielding costs caused by the one or more inventories, a function yielding time required for transportation to or from the one or more inventories, a function yielding overall processing time per unit of goods, a function yielding a distribution of goods across a predetermined spatial area, or a function yielding a number of goods accessible to customers per unit time in a certain region.

10. The method of claim 1, further comprising:

pre-processing, in parallel by one or more third cores of the multi-core server that implements the inventory optimization tool, the probability distributions for the lead time, the demand and the lead time demand, wherein the pre-processing comprises:

determining at least one criterion associated with the lead time data or the demand data;

based on the determined criterion, selecting an amount of parallel-processing resources to use in the determining of the probability distributions of lead time, demand or lead time demand; and performing the determining of the probability distributions of lead time, demand or lead time demand using the selected amount of parallel-processing resources.

11. A computer program product encoded on a non-transitory, tangible storage medium, the product comprising computer readable instructions for causing one or more computers to perform operations comprising:

generating, in parallel by one or more first cores of a multi-core server that implements an inventory optimization tool, one or more probability distributions, comprising:

receiving, by an inventory optimization tool that generates a probability distribution and that includes a simulation component that, when the probability distribution does not satisfy a corresponding threshold fit, performs one or more additional computation processes for generating a simulation of an observed sample for data of the corresponding probability distribution to determine a predictive state of the one or more inventories, inventory data for one or more inventories, wherein the inventory data includes lead time data and demand data, determining, based on the inventory data, a lead time probability distribution for the one or more inventories, and determining, based on the inventory data, a demand probability distribution for the one or more inventories;

generating, in parallel by one or more second cores of the multi-core server that implements the inventory optimization tool, the predictive state, comprising:

determining, by the inventory optimization tool, whether the lead time probability distribution satisfies a first threshold distribution fit, the demand probability distribution satisfies a second threshold distribution fit, or both, in response to determining that the lead time probability distribution satisfies the first threshold distribution fit, the demand probability distribution satisfies the second threshold distribution fit, or both, determining, by the inventory optimization tool, to use the previously-generated lead time probability distribution, demand probability distribution, or both, for generating the predictive state rather than to have the simulation component perform the one or more additional computation processes for generating a simulation of an observed sample to determine the predictive state of the one or more inventories using the inventory data, in response to determining to use the previously-generated lead time probability distribution, demand probability distribution, or both, for generating the predictive state rather than to have the simulation component perform the one or more additional computation processes for generating a simulation of an observed sample using the inventory data, determining a lead time demand probability distribution of the one or more inventories that indicates a demand for the one or more inventories during the lead time using a combination of the determined lead time probability distribution and the determined demand probability distribution, and determining the predictive state of the one or more inventories using the lead time demand probability distribution; and in response to generating the predictive state of the one or more inventories based on the lead time demand probability distribution, moving a loading or unloading of one or more real inventories in the network to another time slot, adding or removing a new real inventory to the network, or adjusting a capacity of a real inventory of the network without receiving, at the one or more computing devices, any user input that affects the actions.

12. A system for simulating one or more inventories in a distribution network, the system comprising:
one or more computers; and
a computer-readable medium coupled to the one or more computers having instructions stored thereon which, when executed by the one or more computers, cause the one or more computers to perform operations, the operations comprising:
generating, in parallel by one or more first cores of a multi-core server that implements an inventory optimization tool, one or more probability distributions, comprising:
receiving, by an inventory optimization tool that generates a probability distribution and that includes a simulation component that, when the probability distribution does not satisfy a corresponding threshold fit, performs one or more additional computation processes for generating a simulation of an observed sample for data of the corresponding probability distribution to determine a predictive state of the one or more inventories, inventory data for one or more inventories, wherein the inventory data includes lead time data and demand data,
determining, based on the inventory data, a lead time probability distribution for the one or more inventories, and
determining, based on the inventory data, a demand probability distribution for the one or more inventories;
generating, in parallel by one or more second cores of the multi-core server that implements the inventory optimization tool, the predictive state, comprising:
determining, by the inventory optimization tool, whether the lead time probability distribution satisfies a first threshold distribution fit, the demand probability distribution satisfies a second threshold distribution fit, or both,
in response to determining that the lead time probability distribution satisfies the first threshold distribution fit, the demand probability distribution satisfies the second threshold distribution fit, or both, determining, by the inventory optimization tool, to use the previously-generated lead time probability distribution, demand probability distribution, or both, for generating the predictive state rather than to have the simulation component perform the one or more additional computation processes for generating a simulation of an observed sample to determine the predictive state of the one or more inventories using the inventory data,
in response to determining to use the previously-generated lead time probability distribution, demand probability distribution, or both, for generating the predictive state rather than to have the simulation component perform the one or more additional computation processes for generating a simulation of an observed sample using the inventory data, determining a lead time demand probability distribution of the one or more inventories that indicates a demand for the one or more inventories during the lead time using a combination of the determined lead time probability distribution and the determined demand probability distribution, and
determining the predictive state of the one or more inventories using the lead time demand probability distribution; and
in response to generating the predictive state of the one or more inventories based on the lead time demand probability distribution, moving a loading or unloading of one or more real inventories in the network to another time slot, adding or removing a new real inventory to the network, or adjusting a capacity of a real inventory of the network without receiving, at the one or more computing devices, any user input that affects the actions.

13. The method of claim 10, wherein the at least one criterion includes at least one of: an inventory data quality, a number of received inventory data records, a deviation of the associated probability distribution compared to a predetermined distribution, or an origin of the received inventory data.

14. The method of claim 13, wherein the at least one criterion includes inventory data quality that indicates a fraction of incomplete or damaged data records.

15. The method of claim 10, wherein determining the lead time demand probability distribution comprises determining, by in parallel by one or more third cores of the multi-core server that implements the inventory optimization tool, the lead time demand probability distribution, the method further comprising:
based on the determined criterion, selecting a number of processing cores for the multi-core server to use in the determining of the probability distributions; and performing the determining of the probability distributions of lead time, demand or lead time demand using the selected number of processing cores.

16. The method of claim 15, wherein the multiple processing cores comprise multiple special purpose processing engines that each comprise multiple processing cores designed to process large data sets.

17. The system of claim 12, wherein determining the lead time demand probability distribution comprises determining, in parallel by one or more third cores of the multi-core server that implements the inventory optimization tool, the lead time demand probability distribution, the operations further comprising:

based on the determined criterion, selecting a number of processing cores from the parallel-processing system to use in the determining of the probability distributions; and performing the determining of the probability distributions of lead time, demand or lead time demand using the selected number of processing cores.

18. The system of claim 17, wherein the multiple processing cores comprise multiple special purpose processing engines that each comprise multiple processing cores designed to process large data sets.

* * * * *